US007444548B2

(12) United States Patent  
Shane (10) Patent No.: US 7,444,548 B2  
(45) Date of Patent: Oct. 28, 2008

(54) METHODS AND SYSTEMS FOR AUTOMATICALLY TESTING WEBSITES AND WEB APPLICATIONS USING KNOWLEDGE BASES OF STANDARD INPUTS AND STANDARD ERRORS

(75) Inventor: Michael Stuart Shane, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1067 days.

(21) Appl. No.: 10/688,494

(22) Filed: Oct. 17, 2003

(65) Prior Publication Data

US 2005/0086643 A1    Apr. 21, 2005

(51) Int. Cl.
G06F 11/00    (2006.01)
(52) U.S. Cl. .............................. 714/38; 714/4; 709/223; 709/224
(58) Field of Classification Search .................... 714/38
See application file for complete search history.

(56) References Cited

U.S. PATENT DOCUMENTS 6,002,871 A *  12/1999  Duggan et al. ............. 717/135
6,360,332 B1 *  3/2002  Weinberg et al. ............. 714/4
2004/0059809 A1 *  3/2004  Benedikt et al. ............ 709/224

OTHER PUBLICATIONS

"Mercury Interactive's Winrunner", Mercury Interactive Corporation, Copyright 2003.

"The Complete Testing Solution for SAP R/3", Mercury Interactive Corporation, Copyright 2001.
"The Complete Testing Solution for Oracle Applications", Mercury Interactive Corporation, Copyright 2001.
"Testing Java Applets and Applications", Mercury Interactive Corporation, Copyright 1999.
White Paper: Revolutionizing Quality Assurance for e-Enterprise, Bernd Greifendeder, Aug. 2002.
White Paper: Testing and Maintenance of Web Sites, Michael Thompson, Jun. 2001.
"Mercury Interactive's Winrunner," Mercury Interactive Corporation, Copyright 2003.

(Continued)

*Primary Examiner*—Emerson C Puente
(74) *Attorney, Agent, or Firm*—Young Law Firm, P.C.

(57) ABSTRACT

A method for automatically testing a website or a web application may include steps of examining the code of an opened Web page or Web application and detecting and categorizing user input fields in the examined code. A knowledge base of standard inputs that stores a plurality of categorized standard inputs may then be consulted. A standard input may then be selected from the knowledge base of standard inputs and applied to the detected input field. When the website or web application generates a message in response to the applied standard input, a knowledge base of standard errors that stores a plurality of standard errors may be consulted. The generated message may then be matched to one of the stored standard errors or a likelihood that the generated message is an error message may be assigned when the generated message does not match one of the stored standard errors. A log entry may then be created, the log entry including sufficient information as to allow a post-facto reconstruction of the circumstances leading to the generation of the error message.

36 Claims, 4 Drawing Sheets

OTHER PUBLICATIONS

"The Complete Testing Solution for SAP R/3," Mercury Interactive Corporation, Copyright 2001.

"The Complete Testing Solution for Oracle Applications," Mercury Interactive Corporation, Copyright 2001.

"Testing Java Applets and Applications," Mercury Interactive Corporation, Copyright 1999.

White Paper: Revolutionizing Quality Assurrance for e-Enterprise, Bernd Greifendeder, Aug. 2002.

White Paper: Testing and Maintenance of Web Sites, Michael Thompson, Jun. 2001.

* cited by examiner

USER INPUT FIELD TYPES

| | |
|---|---|
| USER NAME | 1 |
| USER ACCOUNT | 2 |
| TELEPHONE NUMBER | 3 |
| FAX NUMBER | 4 |
| EMAIL ADDRESS | 5 |
| ⋮ | ⋮ |

302, 304, 306

STANDARD INPUTS

| | |
|---|---|
| 1 | John Smith |
| 1 | JohnSmith |
| 1 | JohnSmithJohnSmith |
| 1 | 111John Smith |
| 1 | JohnSmith111 |
| ⋮ | ⋮ |

322, 306, 324

USER INPUT FIELD NAMES

| | | |
|---|---|---|
| USER NAME | 1 | 1 |
| LOGIN ID | 1 | 2 |
| USER ID | 1 | 3 |
| NAME | 1 | 4 |
| MEMBER NAME | 1 | 5 |
| ⋮ | ⋮ | ⋮ |

METHODS AND SYSTEMS FOR AUTOMATICALLY TESTING WEBSITES AND WEB APPLICATIONS USING KNOWLEDGE BASES OF STANDARD INPUTS AND STANDARD ERRORS

BACKGROUND OF THE INVENTION

1. Field of the Invention

The present invention relates to methods and systems for testing websites and web applications. More particularly, embodiments of the present invention relate to methods and systems for automatically testing websites and website applications using knowledge bases of standard inputs and standard errors.

2. Description of the Prior Art and Related Information

As websites and web applications become more complex, the tools used to test such website and web applications must also become increasingly sophisticated. Indeed, the complexity of the quality assurance (hereafter "QA") tools tasked with testing the functionality and responsiveness of these websites and web applications must keep pace with the size, complexity and increased functionality of today's websites and web applications.

Conventional QA tools for websites and web applications are typically based on a record and playback model, whereby a tester manually logs onto a selected website or web application and runs through a typically transaction or session. The tester's inputs and the path the tester takes through the site are recorded in the form of a script, which may later be played back. The recorded script may be selectively altered, to enable the QA tool to run through a wide variety of user-website interactions. This manual approach is both time consuming and inherently incomplete, as the QA tool relies upon a human created script to guide its progress through the site. Indeed, the tester must key a great many permutations of the inputted data to attempt to fully test the site or application. It is, therefore, likely that conventional QA tools could miss latent errors in the website or web application that could degrade the functionality of the site or application when with certain inputs are entered.

Moreover, current websites and applications are not static constructs, but are frequently upgraded and changed. When the website or application is changed or upgraded, conventional QA tools require that a new script be recorded and the entire process started over again. This record-playback model, therefore, renders conventional tools rather inflexible to even relatively minor changes in the websites and applications for which they are designed.

From the foregoing, therefore, it is clear that improved QA tools are required that do not rely upon such a manual and inflexible record-playback model. Also needed are novel QA tools that enable a more thorough testing of websites and applications, irregardless of the level of complexity of the site or application.

SUMMARY OF THE INVENTION

According to an embodiment thereof, the present invention is a method for a computer to automatically test a website or a web application, comprising the steps of opening a page within the website or web application; examining a code that generated the page; detecting a user input field in the examined code and categorizing the detected input field according to a type of the input field; consulting a knowledge base of standard inputs, the knowledge base of standard inputs storing a plurality of standard inputs that are categorized according to one of a plurality of input field types; selecting a standard input from the knowledge base of standard inputs, the selected standard input being chosen from among the plurality of standard inputs of the selected input field type and applying the selected standard input to the detected input field, and checking a page generated by the website or the web application for a generated message as a result of applying the selected standard input to the detected input field. When the website or web application generates a message in response to the applied standard input, a knowledge base of standard errors may be consulted, the knowledge base of standard errors storing a plurality of standard errors. The method may also include steps of matching the generated message to one of the plurality of stored standard errors or assigning a likelihood that the generated message may be an error message when the generated message does not match one of the plurality of stored standard errors in the knowledge base of standard errors, and generating a log entry, the log entry including at least one of an identification and a path of the generated page, the applied standard input, the generated message and a flag indicating that the generated error message is an error message or is believed to be a potential error message.

The method may also include steps of initiating a testing session by logging in the website or web application, and returning to the examining step to complete successive iterations of the method until an end of the testing session may be reached. The code may include at least one of HTML, XML, JavaScript and Java Applets, for example. The end of the testing session may be reached when a predetermined condition evaluates true. The predetermined condition may, for example, include conditions such as a first selectable number of input fields have been tried; a second selectable number of pages of the website or web application have been opened; after the website or web application has been tested for a third selectable number of minutes; after all pages of the website or web application under a main page of the predetermined URL have been tested, and a user-defined condition has been satisfied or a user-definable event has occurred, for example. A step of adding a new standard input, updating an existing standard input, or removing a standard input to the knowledge base of standard inputs may also be carried out, as may be a step of adding a new standard error, updating an existing standard error, or removing a standard error to/from the knowledge base of standard errors. The knowledge base of standard inputs and the knowledge base of standard errors may be stored in the same or different databases. The returning step may cause the opening step to return to and open the same page within the website or web application. The applying step may apply a different standard input of the selected input field type from the knowledge base of standard inputs in each successive iteration of the method. The returning step may cause the opening step to return to and open a different page within the website or web application.

According to another embodiment thereof, the present invention is also a machine-readable medium having data stored thereon representing sequences of instructions which, when executed by computing device, causes said computing device to automatically test a website or a web application, by performing the steps of: opening a page within the website or web application; examining a code that generated the opened page; detecting a user input field in the examined code and categorizing the detected input field according to a type of the input field; consulting a knowledge base of standard inputs, the knowledge base of standard inputs storing a plurality of standard inputs that are categorized according to one of a plurality of input field types; selecting a standard input from the knowledge base of standard inputs, the selected standard input being chosen from among the plurality of standard inputs of the selected input field type and applying the selected standard input to the detected input field, and checking a page generated by the website or the web application for a generated message as a result of applying the selected standard input to the detected input field. When the website or web application generates a message in response to the applied standard input, a knowledge base of standard errors may be consulted, the knowledge base of standard errors storing a plurality of standard errors. The method may also include the steps of matching the generated message to one of the plurality of stored standard errors or assigning a likelihood that the generated message may be an error message when the generated message does not match one of the plurality of stored standard errors in the knowledge base of standard errors, and generating a log entry, the log entry including at least one of an identification and a path of the generated page, the applied standard input, the generated message and a flag indicating that the generated error message is an error message or is believed to be a potential error message.

According to still another embodiment thereof, the present invention is a computer system suitable for automatically testing a website or a web application, comprising a database for storing a plurality of database objects; at least one processor and at least one data storage device; a plurality of processes spawned by said at least one processor, the processes including processing logic for opening a page within the website or web application; examining a code that generated the opened page; detecting a user input field in the examined code and categorizing the detected input field according to a type of the input field; consulting a knowledge base of standard inputs, the knowledge base of standard inputs storing a plurality of standard inputs that are categorized according to one of a plurality of input field types; selecting a standard input from the knowledge base of standard inputs, the selected standard input being chosen from among the plurality of standard inputs of the selected input field type and applying the selected standard input to the detected input field, and checking a page generated by the website or the web application for a generated message as a result of applying the selected standard input to the detected input field. When the website or web application generates a message in response to the applied standard input, a knowledge base of standard errors may be consulted, the knowledge base of standard errors storing a plurality of standard errors. The method may also include the steps of matching the generated message to one of the plurality of stored standard errors or assigning a likelihood that the generated message may be an error message when the generated message does not match one of the plurality of stored standard errors in the knowledge base of standard errors, and generating a log entry, the log entry including at least one of an identification and a path of the generated page, the applied standard input and the generated message.

The present invention, according to another embodiment thereof, may be thought of as a method for a computer to automatically test a website or a web application, comprising the steps of: opening a page within the website or web application; detecting a user input field in the opened page; selecting a standard input from a knowledge base of standard inputs that stores a plurality of standard inputs, and applying the selected standard input to the detected input field; checking a page generated by the website or the web application for a generated message as a result of applying the selected standard input to the detected user input field; attempting to match the generated message with one of a plurality of standard errors stored in a knowledge base of standard errors, and when a matching message is generated as a result of applying the selected standard input to the detected user input field or when the generated message is determined to have a high likelihood of being an error message, the method may include a step of generating a log entry, the log entry including at least one of an identification and a path of the generated page, the applied standard input, the generated message and a flag indicating that the generated error message is an error message or is believed to be a potential error message.

According to another embodiment thereof, the present invention is also a machine-readable medium having data stored thereon representing sequences of instructions which, when executed by computing device, causes said computing device to automatically test a website or a web application, by performing the steps of: opening a page within the website or web application; detecting a user input field in the opened page; selecting a standard input from a knowledge base of standard inputs that stores a plurality of standard inputs, and applying the selected standard input to the detected input field; checking a page generated by the website or the web application for a generated message as a result of applying the selected standard input to the detected user input field, and attempting to match the generated message with one of a plurality of standard errors stored in a knowledge base of standard errors. When a matching message is generated as a result of applying the selected standard input to the detected user input field or when the generated message may be determined to have a high likelihood of being an error message, a log entry may be generated, the log entry including at least one of an identification and a path of the generated page, the applied standard input, the generated message and a flag indicating that the generated error message is an error message or is believed to be a potential error message.

According to still another embodiment, the present invention is a computer system suitable for automatically testing a website or a web application, comprising: a database for storing a plurality of database objects; at least one processor; at least one data storage device and a plurality of processes spawned by said at least one processor, the processes including processing logic for: opening a page within the website or web application; detecting a user input field in the opened page; selecting a standard input from a knowledge base of standard inputs that stores a plurality of standard inputs, and applying the selected standard input to the detected input field; checking a page generated by the website or the web application for a generated message as a result of applying the selected standard input to the detected user input field, and attempting to match the generated message with one of a plurality of standard errors stored in a knowledge base of standard errors. When a matching message is generated as a result of applying the selected standard input to the detected user input field or when the generated message is determined to have a high likelihood of being an error message, the method may include a step of generating a log entry, the log entry including at least one of an identification and a path of the generated page, the applied standard input, the generated message and a flag indicating that the generated error message is an error message or is believed to be a potential error message.

DETAILED DESCRIPTION

Figure 1:
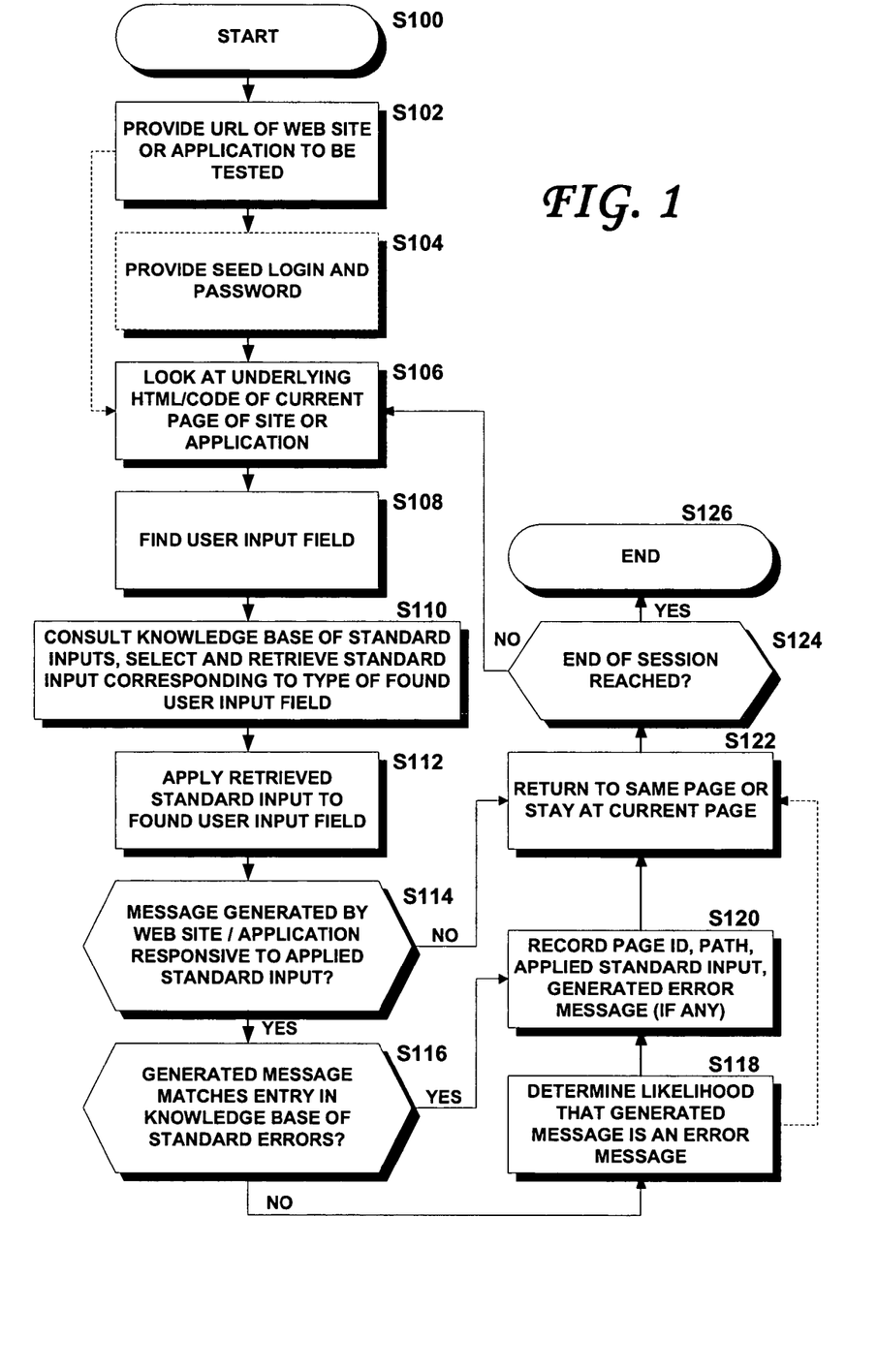
FIG. 1 is a flowchart of a method for testing a website or web application, according to an embodiment of the present invention.

FIG. 1 is a flowchart of a method for testing a website or web application, according to an embodiment of the present invention. As shown therein, the method according to this embodiment of the invention begins at S100. The application embodying an embodiment of the present inventions may then be provided or otherwise pointed to a website or application that is to be tested. More particularly, a Universal Resource Locator (URL) of a website or an application that is to be tested may be provided, as suggested in step S102. If required by the website or web application, a seed login and password may be optionally provided, as shown at S104. Step S104 may be required when gaining access to the website or web application under test is predicated upon successfully logging in to the website or application by, for example, providing the website or application with appropriate credentials, such as a valid username and password. This initiates a testing session, although other ways of initiating a testing session may be used. As shown in the dashed line between S102 and S106, step S104 may be bypassed. After logging in, a first page of the website or application may be opened. According to embodiments of the present invention and as called for by S106, the code (HTML, XML, JavaScript or Java Applets, for example) of the opened page may then be examined for user input fields, as called for by step S108. Herein, an input field includes any code that requests user input. For example, typical user input fields may appear on the website or application as form fields where the user is expected to or may provide some input or value, such as name, password, account number, telephone number or email address, for example. The user is typically able to position a cursor within the form field and enter the requested information.

As noted at S110, the type of the detected user input field may then be determined by comparing the detected user input field to input fields that are stored in a knowledge base of standard inputs. The knowledge base of standard input may include a data store such as a database containing tables of field names and possible values therefore. websites and applications do not use the same name for their user input fields, although similar information is requested from the user in each case. For example, for a user input field that prompts the user to input his or her name or other unique identifier, the knowledge base of standard inputs may include field names such as "User Name", "Login ID", "User ID", "Name", "Member Name" or "Member ID" (to name a few possibilities), which may be categorized as belonging to a "User Name" type; that is, to a type of user input field that accepts a user's name or ID. For a user input field that prompts the user to input his or her account number or membership number or other unique account identifier, the knowledge base of standard inputs may include tables containing field names such as "Acct. Num", "Account Number", "Membership Number", "User Number", "Group Number" and the like, which may collectively be categorized as belonging to a type of user input field named (for example) "User Account" that accept a unique account number of some sort. In this manner, the knowledge base of standard inputs may be configured to store a plurality of user input field names, each categorized into a predetermined input field type.

According to embodiments of the present invention, the detected user input field may then be matched with an existing input field name of the same input field type stored within the knowledge base of standard inputs. If no exact match exists, a determination may be made as to which user input field type the detected input user field most likely belongs. For example, if the detected user input field "User Identifier" is detected, it may be readily determined that this user input field name is most likely of the type "User Name" that requests the user's name or other similar identifier.

According to embodiments of the present invention, each type of user input field within the knowledge base of standard inputs is associated with a plurality of standard inputs. For example, user input fields of the "User Name" type within the knowledge base of standard inputs may be associated with a plurality of corresponding standard inputs—that is, all of the user input fields of the same type may be associated with a plurality of standard inputs. The knowledge base of standard inputs may be pre-seeded with a plurality of standard inputs. According to an embodiment of the present inventions, the knowledge base of standard inputs may be configured to be user-extendible. In this manner, the user may configure the knowledge base of standard inputs to a particular web site or sites or to a particular application or suite of applications. For example, should the user want to check the value "<><>d26<><>62" on every detected user input field, this value may be added to the knowledge base of standard inputs. The standard inputs for user input fields of the "User Name" type may include both entries that are valid for that type of user input field and entries that are invalid for that type of user input filed such as, for example, John Smith
JohnSmith
JohnSmithJohnSmith
111John Smith
JohnSmith 111
1.1.1John Smith
?.sk3/s For a user input field that requests the user's telephone number, the knowledge base of standard inputs may sequentially apply standard inputs such as, for example, 1-800-888-8888
9-1-800-888-888
800-888-8888
888-8888

Thereafter, standard inputs that represent invalid entries may be applied to the detected user input fields to check the response of the web page or application. Examples, of standard inputs that represent invalid entries may include, for example:

1-800-888
1-2-3-3
.800.333.333.333.33
S34-234-4452

These standard inputs are designed to fully test the current webpage or web application. Indeed, the webpage or web application should be sufficiently robust to respond appropriately (i.e., accept all valid entries and correctly generate error messages responsive to invalid entries) to most any input a user might enter. For example, the webpage or application may be designed to return an error message to the user when an entered user name includes non-alphabetical characters or does not include at least one empty space, for example. Therefore, the webpage should return an error when any one of the standard inputs JohnSmith, JohnSmithJohnSmith, 111JohnSmith, 1.1.1John Smith and ?.sk3/s is entered into the form field associated with the detected user input field of the "User Name" type. Similarly, the same web page or application should readily accept the John Smith, 111John Smith and JohnSmith 111 standard inputs when these are entered into the form field associated with the detected user input field of the "User Name" type. The knowledge base of standard inputs, therefore, may be configured to store a plurality of user input field types and an associated plurality of standard inputs for each of the user input field types. These standard inputs may be applied (i.e., entered) into the form field associated with the detected user input field.

As shown at S112, a single standard input value may be applied to the form field associated with the detected user input field. Alternatively a selected number (or all) of the standard input values may be applied to the form field associated with the detected user input field in turn, and the subsequent behavior of the webpage or application observed.

After a selected standard input is applied to the form field associated with the detected user input field, the page generated by the website or the web application is checked for the presence or absence of an error message, as suggested at S114. When the website or web application generates a message in response to the applied standard input, embodiments of the present invention call for consulting a knowledge base of standard errors and matching the generated message with one of a plurality of standard error messages stored in the knowledge base of standard errors. If the error message generated as a result of applying the selected standard input to the form field associated with the detected user input field is not present within the knowledge base of standard errors (NO branch of step S116), the likelihood that the generated message is an error message may be determined, as shown at S118. The knowledge base of standard errors may be pre-seeded with a plurality of standard errors. According to an embodiment of the present inventions, the knowledge base of standard errors may also be configured to be user-extendible. In this manner, the user may configure the knowledge base of standard errors to a particular web site or sites or to a particular application or suite of applications. The knowledge bases of standard inputs and standard errors may be located in separate databases or within a same database. The knowledge base of standard errors may be seeded with standard errors such as, for example:
  Error occurred during the submission. Please restart.
  Null Pointer Exception
  Invalid Input
  Too Large For Field
  Error
  Unrecognized login name and password. Please back up and try again If the generated error message matches one of the stored standard error or if the assigned likelihood that the generated error message is indeed an error message reaches a selectable threshold, a log entry may be generated. According to embodiments of the log entry includes sufficient information as to allow a post-facto reconstruction of the circumstances leading to the generation of the error message. For example, the log entry may include at least an identification and a path of the generated page, the applied standard input and the generated error message, as shown at S120. The log entry may also include a flag indicating that the generated message is an error message or is likely to be an error message. For example, the flag may be set when the applied standard input created an output (e.g., a message) that positively maps onto one or more entries in the knowledge base of standard errors.

Thereafter, as shown at S122, the application embodying an embodiment of the present invention may then return to the previous page or proceed to look for user input fields in the current page, as noted at S122. Step S122 may also be carried out when no error message is generated after the selected standard input is applied to the detected user input field, as noted by the NO branch of step S114. Step S122 may also be carried out when the likelihood that the generated message is an error message, as suggested by the dashed arrow between S118 and S122.

At step S124, it may be determined whether the end of the session has been reached. If not, the method may revert back to step S106, whereupon the code of the current page is examined and the user input fields detected, as shown at S108. Successive iterations of the method described above or variations thereof may then be carried out until the end of the testing session is reached at S126. Indeed, the method described above may be iteratively carried out on the same page, and different standard inputs may be successively applied to a same user input field. This iterative process may help to uncover latent errors in the web page or application under test, as different standard inputs are applied and the resulting behavior of the page or application observed. A great many iterations may be carried out and a great many standard inputs carried out automatically, resulting in a thorough testing of the website or application under consideration. According to further embodiments of the present invention, how and when the session ends may be selectable by the user. For example, a session may end after trying a selectable number of input fields, after reaching a selectable number of web pages, after running for a predetermined time period, after trying all web pages under the main URL or after encountering a selectable number of error messages, for example. Other criteria for ending a testing session may readily be implemented within the context of the present inventions.

Embodiments of the present invention may also be configured to simultaneously test more than one user input field appearing on a page. For example, when testing a page having three user input fields, the application embodying aspects of the present invention may be configured to test each of the first, second and third input fields individually, then to test a combination of the user input fields one and two, a combination of the user input fields one and three, a combination of the user input fields two and three and a combination of the user input fields one, two and three (or some other combination thereof), each time applying a variety of standard inputs to each detected user input field.

By methodically and repetitively examining the code for each page that is opened, detecting user input values in the opened page and applying standard inputs to each detected user input field, an entire website or application may be traversed and thoroughly tested automatically, without resorting to a costly, time consuming and potentially incomplete human generated script.

Figure 2:
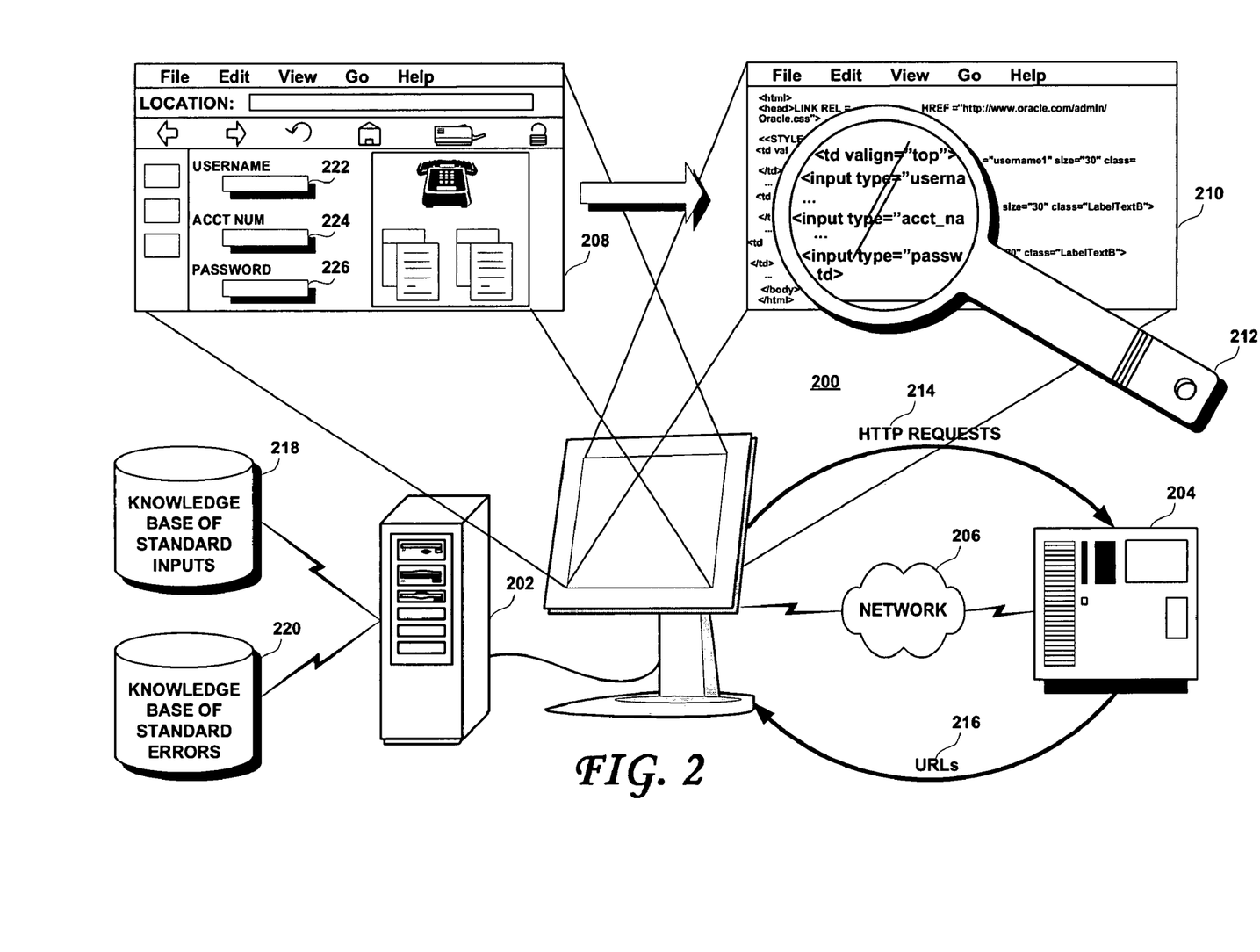
FIG. 2 is a diagram of a system for automatically testing websites and web-based applications, according to an embodiment of the present invention.

FIG. 2 is a diagram of a system 200 for automatically testing websites, according to an embodiment of the present invention. As shown, the system 200 may include a web page or other server 204 coupled to a remote computing device 202 through a network 206. The network 206 may include, for example, the Internet. Also coupled to the computing device 202 is the knowledge base of standard inputs 218 and the knowledge base of standard errors 220. The knowledge bases 218, 220 may also be accessible through the network 206 and/or through other means. In practice, the computing device 202 may run a web application embodying an embodiment of the present inventions. Upon being supplied with a URL, username and password, the application may generate HTTP requests at 214 to the server 204 and receive and URLs in response to the requests, as shown at 216. The computing device may then render the web pages referenced by the received URL, as suggested by the exemplary and illustrative web page 208. The web page 208 includes three user input fields, shown at reference numerals 222, 224 and 226. The application embodying an embodiment of the present inventions may then view the underlying source code of the currently displayed web page, as suggested at reference numeral 210. In Microsoft's Internet Explorer® 6, for example, the code containing the commands necessary to render a web page may be revealed by selecting "Source" from the "View" pull-down menu.

Thereafter, the code that generated the current page is examined, as suggested by the metaphorical magnifying glass 212. Code corresponding to user input fields is then identified and the detected user input field categorized according to the type thereof. Thereafter, the knowledge base of standard inputs 218 may then be consulted, a standard input of the correct type for the detected user input field selected and applied thereto. The page generated as a result of the application of the selected standard input(s) to the detected user input field(s) may then be checked for any generated message(s). When the web page or web application generates a message or messages in response to the applied standard input(s), the knowledge base of standard errors may be consulted. If there is no exact match in the knowledge base of standard errors for the generated message, a determination of the likelihood that the generated message is indeed an error message is carried out. Depending upon the outcome of this determination, a log entry may be created. The log entry may include, for example, an identification and a path of the generated page, the applied standard input, the generated message and a flag indicating that the generated message mapped onto one or more of the entries in the knowledge bases of standard errors. The application incorporating an embodiment of the present invention may then revert back to the same web page to complete successive iterations of the method disclosed herein until the end of the testing session is reached. Alternatively, the application may remain at the current page and repeat the above-detailed steps for the currently rendered page.

Figure 3:
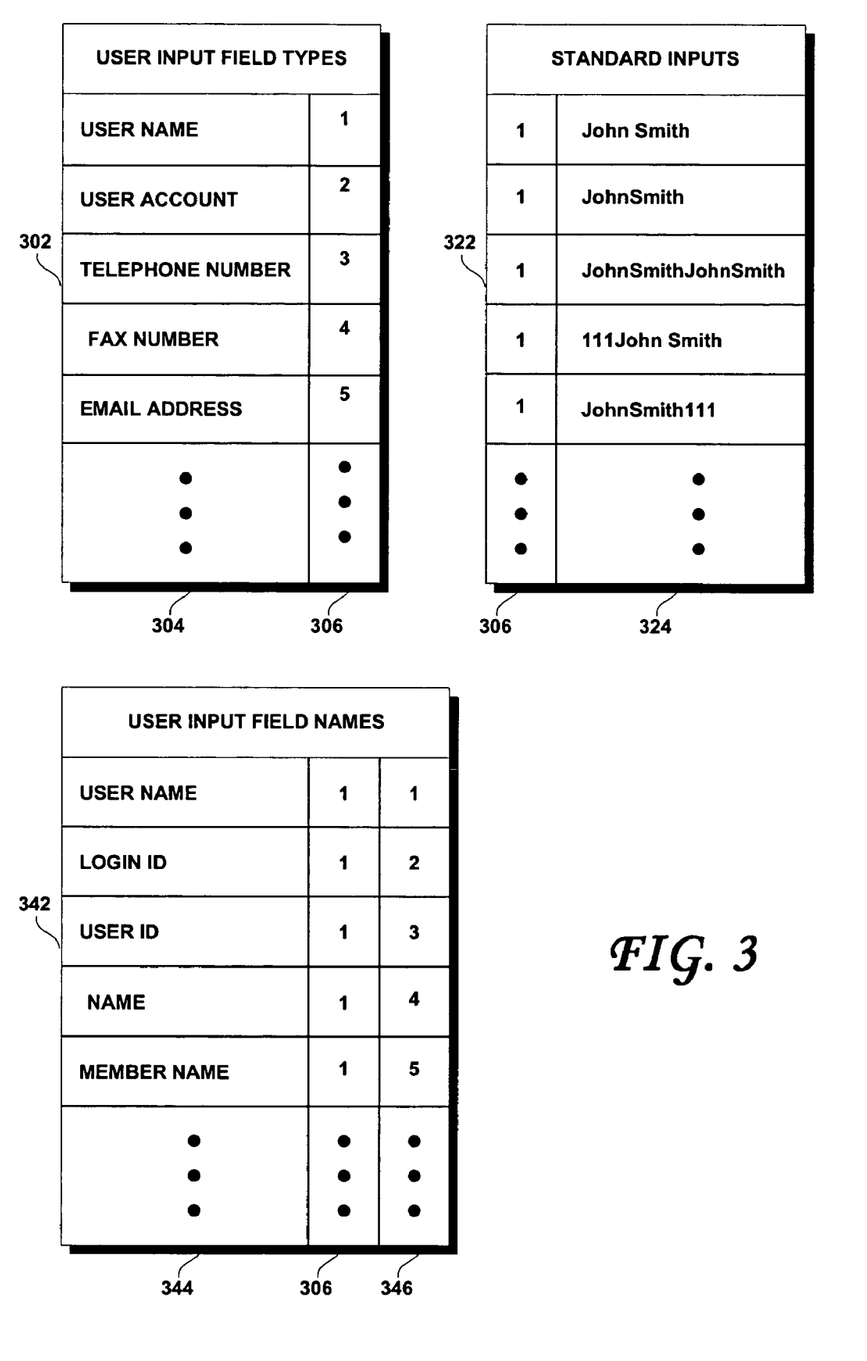
FIG. 3 illustrates aspects of the data model of the knowledge base of standard inputs, according to an embodiment of the present invention.

FIG. 3 illustrates aspects of one possible data model of the knowledge base of standard inputs, according to an embodiment of the present invention. As shown therein, the knowledge base of standard inputs may include a plurality of tables, some representatives of which are shown at reference numerals 302, 322 and 342. Table 302 may store a plurality of user input field types 304, together with their respective keys 306. For example, the user input field type "User Name" is associated with key 1, the user input field type "User Account" is associated with key 2, the user input key type "Telephone Number" is associated with key 3 and so on.

According to an embodiment of the present invention, each user input field type may be associated with at least one and preferably a plurality of standard inputs. One or more standard input tables 322 stores these standard inputs. As shown, each standard input 324 is associated with a key that is associated, in turn, with a user input field type. As shown, all of the standard inputs 324 in table 322 are associated with key 1 which, as shown in table 302, corresponds to the "User Name" user input field type. That is, each of the standard inputs "John Smith", "JohnSmith", "JohnSmithJohnSmith", "111John Smith" and "JohnSmith111" are each of the "User Name" user input field type and would be selected and applied when a user input field of the "User Name" type is detected in the website or application under test.

The knowledge base of standard inputs 218 may also include a table 342 of user input field names. These names represent the different names that may be given to user input fields of a given type. For example, user input fields of the "User Name" type may be variously called "User Name", "Login ID", "User ID", "Name" or "Member Name", for example. Each of these is associated with a primary key 306 that is associated with one of the plurality of user input field types 304 in table 302 and is also associated with a secondary key 346. Therefore, the combination of primary key and secondary key identifies a unique user input field name, as well as the type to which the referenced user input field name belongs.

In practice, therefore, the application incorporating an embodiment of the present inventions would detect a user input field, and attempt to match its name with one of the user input field names 344 in table 342. Upon finding a match or determining the type of the detected user input type, table 322 may be consulted and one or more standard inputs associated with the key associated with the determined type of user input fields may be applied to the detected user input field, in the manner detailed above.

Figure 4:
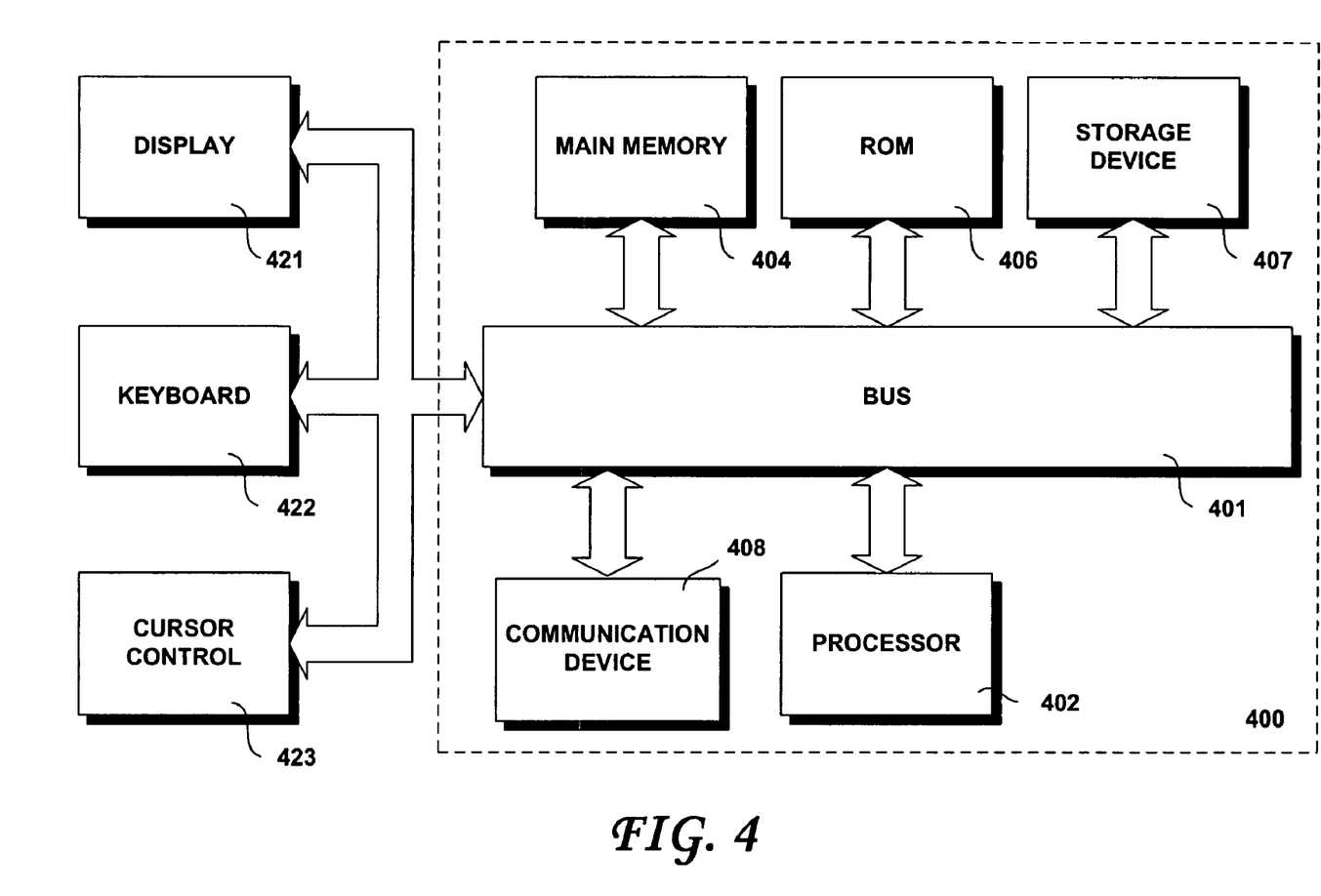
FIG. 4 illustrates a block diagram of a computer system within which an embodiment of the present invention may be implemented.

FIG. 4 illustrates a block diagram of a computer system 400 upon which embodiments of the present inventions may be implemented. Computer system 400 includes a bus 401 or other communication mechanism for communicating information, and one or more processors 402 (one shown in FIG. 4) coupled with bus 401 for processing information. Computer system 400 further comprises a random access memory (RAM) or other dynamic storage device 404 (referred to as main memory), coupled to bus 401 for storing information and instructions to be executed by processor(s) 402. Main memory 404 also may be used for storing temporary variables or other intermediate information during execution of instructions by processor 402. Computer system 400 also includes a read only memory (ROM) and/or other static storage device 406 coupled to bus 401 for storing static information and instructions for processor 402. A data storage device 407, such as a magnetic disk or optical disk, is coupled to bus 401 for storing information and instructions. The computer system 400 may also be coupled via the bus 401 to a display device 421, such as a cathode ray tube (CRT), for displaying information to a computer user. An alphanumeric input device 422, including alphanumeric and other keys, is typically coupled to bus 401 for communicating information and command selections to processor(s) 402. Another type of user input device is cursor control 423, such as a mouse, a trackball, or cursor direction keys for communicating direction information and command selections to processor 402 and for controlling cursor movement on display 421.

The present invention is related to the use of computer system 400 and/or to a plurality of such computer systems to automatically test websites or web applications. According to one embodiment, the testing described herein may be provided by one or more computer systems 400 in response to processor(s) 402 executing sequences of instructions contained in memory 404. Such instructions may be read into memory 404 from another computer-readable medium, such as data storage device 407. Execution of the sequences of instructions contained in memory 404 causes processor(s) 402 to perform the process steps that will be described hereafter. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Thus, the present invention should be limited only by the claims as set forth below.

What is claimed is:

1. A method for a computer to automatically test a website or a web application without the use of a test script, comprising the steps of:
    opening a page within the website or web application;
    examining a code that generated the page;
    detecting a user input field in the examined code and categorizing the detected input field according to a type of the input field;
    consulting a knowledge base of standard inputs, the knowledge base of standard inputs storing a plurality of standard inputs that are categorized according to one of a plurality of input field types;
    selecting a standard input from the knowledge base of standard inputs, the selected standard input being chosen from among the plurality of standard inputs of the selected input field type according to the categorized input field type of the detected user input field in the examined code and applying the selected standard input to the detected input field;
    checking a page generated by the website or the web application for a generated message as a result of applying the selected standard input to the detected input field;
    when the website or web application generates a message in response to the applied standard input, consulting a knowledge base of standard errors, the knowledge base of standard errors storing a plurality of standard errors and determining the generated message is an error message when the generated message matches one of the plurality of stored standard errors and assigning a likelihood that the generated message is an error message when the generated message does not match one of the plurality of stored standard errors in the knowledge base of standard errors, and
    generating a log entry, the log entry including at least one of an identification and a path of the generated page, the applied standard input and the generated message and a flag indicating that the generated message is an error message or is believed to be a potential error message.

2. The method of claim 1, further including the steps of:
    initiating a testing session by logging in the website or web application, and
    returning to the examining step to complete successive iterations of the method until an end of the testing session is reached.

3. The method of claim 2, wherein the end of the testing session is reached when a predetermined condition evaluates true.

4. The method of claim 3, wherein the predetermined condition includes at least one of:
    a first selectable number of input fields have been tried;
    a second selectable number of pages of the website or web application have been opened;
    after the website or web application has been tested for a third selectable number of minutes;
    after all pages of the website or web application under a main page of the predetermined URL have been tested, and
    a user-defined condition has been satisfied or a user-definable event has occurred.

5. The method of claim 2, wherein the returning step causes the opening step to return to and open a same page within the website or web application.

6. The method of claim 5, wherein the applying step applies a different standard input of the selected input field type from the knowledge base of standard inputs in each successive iteration of the method.

7. The method of claim 2, wherein the returning step causes the opening step to return to and open a different page within the website or web application.

8. The method of claim 1, wherein the code includes at least one of HTML, XML, JavaScript and Java Applets.

9. The method of claim 1, further comprising a step of at least one of adding a new standard input, updating an existing standard input and removing an existing standard to/from the knowledge base of standard inputs.

10. The method of claim 1, further comprising a step of at least one of adding a new standard error, updating an existing standard error and removing an existing standard error to/from the knowledge base of standard errors.

11. The method of claim 1, wherein the knowledge base of standard inputs and the knowledge base of standard errors are stored in a same database.

12. A machine-readable medium having data stored thereon representing sequences of instructions which, when executed by computing device, causes said computing device to automatically test a website or a web application without the use of a test script, by performing the steps of:
    opening a page within the website or web application;
    examining a code that generated the opened page;
    detecting a user input field in the examined code and categorizing the detected input field according to a type of the input field;
    consulting a knowledge base of standard inputs, the knowledge base of standard inputs storing a plurality of standard inputs that are categorized according to one of a plurality of input field types;
    selecting a standard input from the knowledge base of standard inputs, the selected standard input being chosen from among the plurality of standard inputs of the selected input field type according to the categorized input field type of the detected user input field in the examined code and applying the selected standard input to the detected input field;
    checking a page generated by the website or the web application for a generated message as a result of applying the selected standard input to the detected input field;
    when the website or web application generates a message in response to the applied standard input, consulting a knowledge base of standard errors, the knowledge base of standard errors storing a plurality of standard errors and determining the generated message is an error message when the generated message matches one of the plurality of stored standard errors and assigning a likelihood that the generated message is an error message when the generated message does not match one of the plurality of stored standard errors in the knowledge base of standard errors, and
    generating a log entry, the log entry including at least one of an identification and a path of the generated page, the applied standard input, the generated message and a flag indicating that the generated message is an error message or is believed to be a potential error message.

13. The medium of claim 12, further including the steps of:
  initiating a testing session by logging in the website or web application, and
  returning to the examining step to complete successive iterations of the steps until an end of the testing session is reached.

14. The medium of claim 13, wherein the end of the testing session is reached when a predetermined condition evaluates true.

15. The medium of claim 14, wherein the predetermined condition includes at least one of:
  a first selectable number of input fields have been tried;
  a second selectable number of pages of the website or web application have been opened;
  after the website or web application has been tested for a third selectable number of minutes;
  after all pages of the website or web application under a main page of the predetermined URL have been tested, and
  a user-defined condition has been satisfied or a user-definable event has occurred.

16. The medium of claim 13, wherein the returning step causes the opening step to return to and open a same page within the website or web application.

17. The medium of claim 16, wherein the applying step applies a different standard input of the selected input field type from the knowledge base of standard inputs in each successive iteration of the steps.

18. The medium of claim 13, wherein the returning step causes the opening step to return to and open a different page within the website or web application.

19. The medium of claim 12, wherein the code includes at least one of HTML, XML, JavaScript and Java Applets.

20. The medium of claim 12, further comprising a step of at least one of adding a new standard input, updating an existing standard input and removing an existing standard to/from the knowledge base of standard inputs.

21. The medium of claim 12, further comprising a step of at least one of adding a new standard error, updating an existing standard error and removing an existing standard error to/from the knowledge base of standard errors.

22. The medium of claim 12, wherein the knowledge base of standard inputs and the knowledge base of standard errors are stored in a same database.

23. A computer system suitable for automatically testing a website or a web application, comprising:
  a database for storing a plurality of database objects;
  at least one processor;
  at least one data storage device;
  a plurality of processes spawned by said at least one processor, the processes including processing logic for:
  opening a page within the website or web application;
  examining a code that generated the opened page;
  detecting a user input field in the examined code and categorizing the detected input field according to a type of the input field;
  consulting a knowledge base of standard inputs, the knowledge base of standard inputs storing a plurality of standard inputs that are categorized according to one of a plurality of input field types;
  selecting a standard input from the knowledge base of standard inputs, the selected standard input being chosen from among the plurality of standard inputs of the selected input field type according to the categorized input field type of the detected user input field in the examined code and applying the selected standard input to the detected input field;
  checking a page generated by the website or the web application for a generated message as a result of applying the selected standard input to the detected input field;
  when the website or web application generates a message in response to the applied standard input, consulting a knowledge base of standard errors, the knowledge base of standard errors storing a plurality of standard errors and determining the generated message is an error message when the generated message matches one of the plurality of stored standard errors and assigning a likelihood that the generated message is an error message when the generated message does not match one of the plurality of stored standard errors in the knowledge base of standard errors, and
  generating a log entry, the log entry including at least one of an identification and a path of the generated page, the applied standard input, the generated message and a flag indicating that the generated message is an error message or is believed to be a potential error message.

24. The computer system of claim 23, further including processing logic for:
  initiating a testing session by logging in the website or web application, and
  returning to the examining step to complete successive iterations of the logic until an end of the testing session is reached.

25. The medium of claim 24, wherein the end of the testing session is reached when a predetermined condition evaluates true.

26. The computer system of claim 25, wherein the predetermined condition includes at least one of:
  a first selectable number of input fields have been tried;
  a second selectable number of pages of the website or web application have been opened;
  after the website or web application has been tested for a third selectable number of minutes;
  after all pages of the website or web application under a main page of the predetermined URL have been tested, and
  a user-defined condition has been satisfied or a user-definable event has occurred.

27. The computer system of claim 24, wherein the returning logic causes the opening step to return to and open a same page within the website or web application.

28. The computer system of claim 27, where the applying logic applies a different standard input of the selected input field type from the knowledge base of standard inputs in each successive iteration of the logic.

29. The computer system of claim 24, wherein the returning logic causes the opening step to return to and open a different page within the website or web application.

30. The computer system of claim 23, wherein the code includes at least one of HTML, XML, JavaScript and Java Applets.

31. The computer system of claim 23, further comprising logic for at least one of adding a new standard input, updating an existing standard input and removing an existing standard to/from the knowledge base of standard inputs.

32. The computer system of claim 23, further comprising logic for at least one of adding a new standard error, updating an existing standard error and removing an existing standard error to/from the knowledge base of standard errors.

33. The computer system of claim 23, wherein the knowledge base of standard inputs and the knowledge base of standard errors are stored in a same database.

34. A method for a computer to automatically test a website or a web application without the use of a test script, comprising the steps of:
- opening a page within the website or web application;
- detecting a user input field in the opened page;
- based upon a type of the detected user input field in the opened page, selecting a standard input from a knowledge base of standard inputs that stores a plurality of standard inputs, and applying the selected standard input to the detected input field;
- checking a page generated by the website or the web application for a generated message as a result of applying the selected standard input to the detected user input field;
- attempting to match the generated message with one of a plurality of standard errors stored in a knowledge base of standard errors, and
- when a matching message is generated as a result of applying the selected standard input to the detected user input field and when the generated message is determine to have a high likelihood of being an error message, generating a log entry, the log entry including at least one of an identification and a path of the generated page, the applied standard input, the generated message and a flag indicating that the generated message is an error message or is believed to be a potential error message.

35. A machine-readable medium having data stored thereon representing sequences of instructions which, when executed by computing device, causes said computing device to automatically test a website or a web application without the use of a test script, by performing the steps of:
- opening a page within the website or web application;
- detecting a user input field in the opened page;
- based upon a type of the detected user input field in the opened page, selecting a standard input from a knowledge base of standard inputs that stores a plurality of standard inputs, and applying the selected standard input to the detected input field;
- checking a page generated by the website or the web application for a generated message as a result of applying the selected standard input to the detected user input field;
- attempting to match the generated message with one of a plurality of standard errors stored in a knowledge base of standard errors, and
- when a matching message is generated as a result of applying the selected standard input to the detected user input field and when the generated message is determined to have a high likelihood of being an error message, generating a log entry, the log entry including at least one of an identification and a path of the generated page, the applied standard input, the generated message and a flag indicating that the generated message is an error message or is believed to be a potential error message.

36. A computer system suitable for automatically testing a website or a web application without the use of a test script, comprising:
- a database for storing a plurality of database objects;
- at least one processor;
- at least one data storage device;
- a plurality of processes spawned by said at least one processor, the processes including processing logic for;
- opening a page within the website or web application;
- detecting a user input field in the opened page;
- based upon a type of the detected user input field in the opened page, selecting a standard input from a knowledge base of standard inputs that stores a plurality of standard inputs, and applying the selected standard input to the detected input field;
- checking a page generated by the website or the web application for a generated message as a result of applying the selected standard input to the detected user input field;
- attempting to match the generated message with one of a plurality of standard errors stored in a knowledge base of standard errors, and
- when a matching message is generated as a result of applying the selected standard input to the detected user input field and when the generated message is determined to have a high likelihood of being an error message, generating a log entry, the log entry including at least one of an identification and a path of the generated page, the applied standard input, the generated message and a flag indicating that the generated message is an error message or is believed to be a potential error message.

* * * * *

UNITED STATES PATENT AND TRADEMARK OFFICE
CERTIFICATE OF CORRECTION

| | | |
|---|---|---|
| PATENT NO. | : 7,444,548 B2 | Page 1 of 1 |
| APPLICATION NO. | : 10/688494 | |
| DATED | : October 28, 2008 | |
| INVENTOR(S) | : Shane | |

It is certified that error appears in the above-identified patent and that said Letters Patent is hereby corrected as shown below:

In column 14, line 46, in Claim 28, delete "where" and insert -- wherein --, therefor.

In column 15, line 19, in Claim 34, delete "determine" and insert -- determined --, therefor.

In column 16, line 18, in Claim 36, delete "for;" and insert -- for: --, therefor.

Signed and Sealed this

Twentieth Day of April, 2010

David J. Kappos
*Director of the United States Patent and Trademark Office*